Dec. 19, 1961  F. A. LAPINSKI ET AL  3,013,855
RECORDING APPARATUS
Filed Feb. 26, 1958  2 Sheets-Sheet 1

INVENTORS.
FRANCIS A. LAPINSKI
JOHN A. DEVER
BY
*Arthur H. Swanson*
ATTORNEY.

Dec. 19, 1961  F. A. LAPINSKI ET AL  3,013,855
RECORDING APPARATUS

Filed Feb. 26, 1958  2 Sheets-Sheet 2

INVENTORS.
FRANCIS A. LAPINSKI
JOHN A. DEVER
BY
ATTORNEY.

United States Patent Office 3,013,855
Patented Dec. 19, 1961

3,013,855
RECORDING APPARATUS
Francis A. Lapinski, Philadelphia, and John A. Dever, Gladyne, Pa., assignors to Minneapolis-Honeywell Regulator Company, Minneapolis, Minn., a corporation of Delaware
Filed Feb. 26, 1958, Ser. No. 717,780
8 Claims. (Cl. 346—29)

The present invention relates generally to apparatus for producing a record of the simultaneous values of two variables, and relates specifically to such recording apparatus wherein a single marking means produces such a record for two related variables. More specifically, the invention relates to such recording apparatus wherein a simultaneous record of the related values of the two variables is produced in the form of a trace composed of a series of markings having a characteristic whose magnitude at any position along the trace is representative of the value of one of the variables which exists when the other of the variables has the value represented by that position along the trace.

A general object of the present invention is to provide improved recording apparatus of the type wherein a single marking element produces a record of the simultaneous values of two variables. A specific object of the invention is to provide improved apparatus of this type wherein the single marking element is moved along a path relative to a record medium in such a manner that its position along the path always represents the value of a first of the two variables, and wherein the marking element produces a series of marks on the record medium to form a trace coinciding with said path, these marks having at least one characteristic whose magnitude at any position along the trace is a function of the value had by the second of the two variables when said first variable has the value which is represented by that position.

A more specific object of the invention is to provide improved recording apparatus as just specified wherein the frequency of occurrence of the marks along the trace or record is a function of the value of said second variable, whereby adjacent marks in the trace are spaced apart by an amount which is a function of this value.

An even more specific object of the invention is to provide improved apparatus of the type specified above wherein the marks forming the trace are produced progressively closer together in the trace as the value of said second variable progressively increases, and are produced progressively farther apart as the value of this variable progressively decreases, whereby the intensity of the trace at any given position therealong represents the particular value of said second variable which corresponds to the particular, coexistent value of said first variable represented by that position along the trace.

Another specific object of the invention is to provide improved apparatus of the foregoing type wherein each of the marks forming the trace has an intensity which is a function of the value of said second variable.

Still another specific object of the invention is to provide such improved apparatus wherein the marking element is moved cyclically in its path relative to the record medium in synchronism with cyclic variations in the value of said first variable.

Apparatus for simultaneously recording the related values of two variables is useful in many applications. The forms of such apparatus which have been known and used heretofore, however, have usually been subject to one or another disadvantage due to their requiring such arrangements as two separate recording means, relatively complex mechanical stylus actuating mechanisms, and the like. These and the other disadvantages of the prior recorders are not present in the improved recording apparatus according to the present invention, however, since this apparatus provides the required record of the simultaneous values of the two variables using but a single recording element which is actuated by a relatively simple arrangement, as will be readily apparent from the description of this apparatus to be presented hereinafter.

Although the recording apparatus of the invention will be found to be extremely useful in numerous applications requiring the recording of two variables in a simple manner, this apparatus is particularly well adapted for use as a so-called ceilometer recorder for recording the intensities of reflected light occurring for various angles of a ceilometer projector in a ceilometer or cloud height measuring arrangement. Such arrangements, employing the less desirable prior recorders mentioned above, are well known in the meteorological art.

In view of the particular utility of the recording apparatus of the invention as a ceilometer recorder, the embodiment of the invention illustrated and described herein by way of example is one in which this apparatus is utilized as a ceilometer recorder.

Accordingly, it is another specific object of the present invention to provide an improved ceilometer recorder which produces, in a relatively simple manner, a readily readable record trace composed of a series of marks, these marks being spaced, at any position along the trace, as a function of the value of the reflected light intensity occurring at the corresponding value of the ceilometer projector angle as exhibited by the position of this spacing on the record medium.

To the end of fulfilling the foregoing and other desirable objects and requirements, novel recording apparatus embodying the present invention preferably includes a marking element whose transverse position with respect to a record medium is made to correspond to, and hence be representative of, the value of a first of two variables. Also in accordance with the invention, the marking element does not make a continuous line or trace on the record medium as the element moves along its path. Instead, the element is only periodically energized so as to make a series of marks along its path to form the trace or record on the medium. Further, the frequency with which the element is energized to mark the medium is made to bear a predetermined relationship to the value of the second of said two related variables. Accordingly, the element produces a trace on the record medium which consists of a number of marks, the spacing between any two adjacent marks being a function of the specific value of said second variable which exists when the value of said first variable is that represented by the specific position along the trace at which this spacing occurs.

In the particular embodiment of the invention illustrated herein by way of example, wherein the recorder embodying the invention is utilized as a ceilometer recorder, the marking or recording element is a stylus which is reciprocated across an electrosensitive recording chart in synchronism with the cyclically repeated angular motion of a ceilometer projector. The stylus produces a mark on the chart only when the stylus is energized, and it is so energized, with electrical pulses, at a frequency which is a direct function of the value of a recorder input signal. This signal, in turn, is a direct function of the intensity of received, cloud-reflected light sent from the projector.

Therefore, the stylus produces a series of marks on the chart as it sweeps across the latter in synchronism with the angular motion of the projector, the resulting trace thus having a variable density which shows the relative values of the received light intensity for the various, corresponding values of projector angle. Since the closeness of the marks, and hence the density of the trace, reach a maximum at the position on the chart corresponding to the angular position of the projector at which the received reflected light intensity is a maximum, the height of the reflecting cloud is clearly exhibited on the chart.

If desired, the varying density of the trace with varying values of light intensity can be intensified by causing the intensity of the energizing or marking pulses supplied to the stylus to vary as a direct function of the light intensity.

A better understanding of the present invention may be had from the following detailed description when read in connection with the accompanying drawings, wherein.

Figure 1:
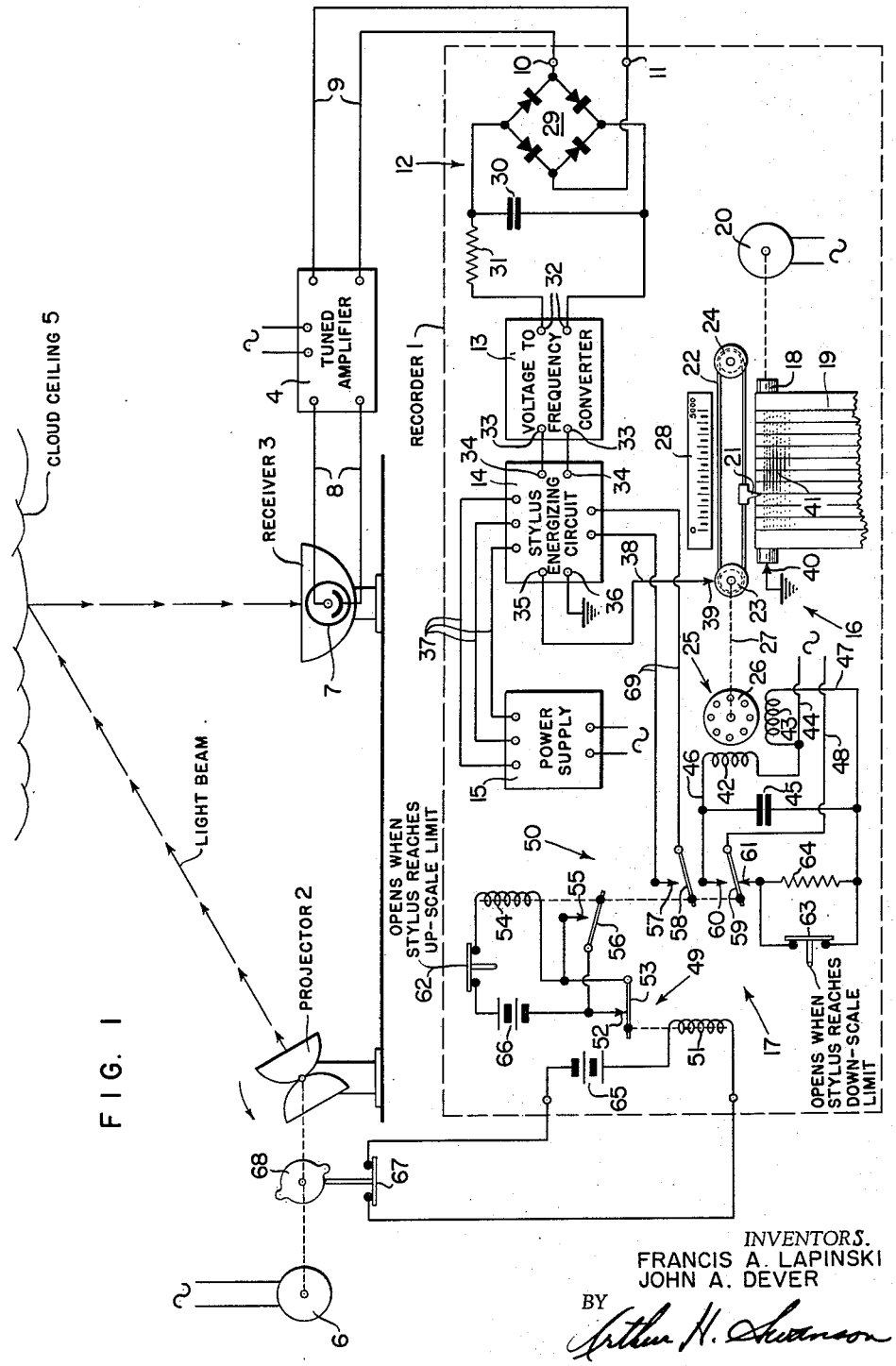
FIG. 1 is a schematic representation of a ceilometer arrangement including a ceilometer recorder which embodies the present invention.

As previously noted, the embodiment of the present invention chosen for illustration herein is one in which a recorder embodying the invention is employed as a ceilometer recorder. This recorder is shown at 1 in FIG. 1 of the drawings as a portion of a ceilometer arrangement which also includes the usual scanning beam projector 2, receiver or detector 3, and tuned amplifier 4.

The purpose of the ceilometer arrangement is to measure and record the height of clouds above a reference plane, such as the ground. To this end, the projector 2 is arranged to project a beam of radiant energy or light up from the ground to the cloud ceiling, such as that shown at 5, and the receiver 3 is arranged to detect whatever part of this beam is reflected to the receiver by the cloud ceiling 5. Further, the projector 2 is rotated in the usual manner, as by a synchronous motor 6, so that the beam sent out by the projector 2 scans or sweeps the cloud ceiling repeatedly at a predetermined, known rate. Since the projector 2 has two reflecting members, as shown, two cloud scanning cycles are produced for each rotation of the projector, each cycle starting when the projected beam is horizontal, and continuing until the beam has swept up to a vertical position.

In accordance with the usual procedure, the receiver 3 is located at a fixed distance from the projector 2, and is located in the vertical plane described by the light beam projected by the projector. Thus, as is well known to those skilled in the art, the height of the cloud ceiling 5 is a known function of the value of the angular position of the projector 2 at which the intensity of the projected light reflected from the cloud ceiling and reaching the receiver 3 has a maximum value.

The receiver 3 includes a light sensitive device, such as a photoelectric cell 7, which produces an output signal of a magnitude dependent upon the intensity of the light reaching the receiver 3. This signal, which appears between conductors 8, is passed through the tuned amplifier 4, and is applied over conductors 9 to the input terminals 10 and 11 of the recorder 1.

In order that the arrangement will be sensitive to only the reflected light originating from the projector 2, the beam of light leaving the projector is interrupted in the usual manner at a known, fixed rate, such as 120 cycles per second, as by means of a rotating shutter, not shown. As a result, any and all of the wanted light which reaches the receiver pulses at this 120 cycle per second frequency. By arranging the amplifier 4 to be tuned to this frequency, the signal applied to the recorder input terminals 10 and 11 is a 120 cycle per second A.C. signal whose magnitude is a function of the intensity of only the wanted light reaching the receiver 3.

The purpose of the recorder 1 is to produce a record of the values of the intensity of the cloud-reflected light reaching the receiver 3 for the corresponding values of the angular position of the projector 2. To this end, the recorder 1 includes an input signal rectifying and filtering circuit 12, a voltage to frequency converter 13, a recording sylus energizing circuit 14 with its power supply 15, a recording means 16, and a stylus scanning control circuit 17.

The recording means or portion 16 includes a roll 18 which is arranged to support and advance a record medium or chart 19. The latter is given a desirably slow downward movement, as shown in FIG. 1, by means of a synchronous chart drive motor 20.

Cooperating with the chart 19 is a stylus 21 which is carried on an endless cable 22 suspended above the chart 19 and roll 18 between pulleys 23 and 24. The stylus 21 is maintained in suitably light engagement with the surface of the chart 19, and is moved back and forth transversely of the chart by means of a reversible sweep drive or scanning motor 25 whose rotor 26 is coupled through a suitable mechanical linkage 27 to the pulley 23. Rotation of the rotor 26 in one direction causes the cable 22 to move the stylus 21 across the chart 19 to the right or up-scale in FIG. 1, and rotation of the rotor 26 in the opposite direction causes the stylus 21 to be moved across the chart to the left or down-scale.

As will be explained in more detail hereinafter, the circuit 17 controls the operation of the motor 25 so that the stylus 21 is reciprocated across the chart 19 in synchronism with the cyclically repeated angular motion of the projector 2. As a result, the position of the stylus 21 along its path across the chart 19 is made to correspond to, and hence to be representative of, the value of the angular position of the beam emanating from the projector 2. Accordingly, a scale 28 extending transversely of the chart 19 can be, and is shown as being, calibrated in terms of cloud height, since the latter is a known function of the angular position of the projected light beam for the condition of maximum intensity of received light as was explained hereinbefore. As will be apparent, the scale 28 is used in conjunction with the traces of received light intensity produced by the stylus 21 as will be described hereinafter.

As was explained hereinbefore, the stylus 21 does not mark a continuous trace on the chart 19 as the stylus is moved along its path in contact with the chart, but instead is arranged to mark the chart only when the stylus is energized. To this end, the chart is desirably of the electrosensitive type, and may well be formed of the well known "Teledeltos" paper, for example. Moreover, the stylus 21 is desirably in the form of a wire electrode which produces the desired character of mark or dot on the chart when a marking voltage is applied between the stylus and the roll 18.

As was also explained hereinbefore, the apparatus according to the invention is arranged to energize the stylus 21, or, more specifically, to supply energizing or marking voltage to the stylus, at a rate or frequency which is a direct function of the value of the received light intensity, which value is represented by the magnitude of the input signal or voltage applied to the recorder input terminals 10 and 11. Briefly, this is accomplished in the recorder 1 by first rectifying and filtering this variable voltage signal in the circuit 12, then using the resulting signal in the converter 13 to produce a variable frequency signal of a frequency which is dependent upon the voltage of the input signal, and finally using this variable frequency signal in the circuit 14 to cause the latter to supply energizing or marking pulses of voltage to the stylus 21 at a rate which is equal to the frequency of the variable frequency signal.

To the end of providing the foregoing operation, the recorder input terminals 10 and 11 are connected to the input of a bridge-type rectifier 29 which is included in the circuit 12. The output of the rectifier 29 is connected across a filter condenser 30 and through a filter resistor 31 to input terminals 32 of the voltage to frequency converter 13. Thus, a rectified or D.C. version of the A.C. recorder input signal is applied between the converter input terminals 32, this D.C. signal having a magnitude which is a direct function of the received light intensity.

The converter 13 produces between its output terminals 33, and applies between the input terminals 34 of the circuit 14, a variable frequency signal whose frequency is determined by the magnitude of the D.C. signal applied between the converter input terminals 32. For accomplishing this, the converter 13 may be of any of the forms of suitable voltage to frequency converters known in the art. Alternatively, the converter 13 may well be of the form of the novel voltage to frequency converter disclosed and claimed in the copending application of Donald E. Kotas, which was filed on June 13, 1957, and bears Serial No. 665,421. However, the details of the particular form of converter used as the converter 13 are immaterial insofar as the present invention is concerned, and hence need not be discussed further herein.

The variable frequency signal applied to the input terminals 34 of the stylus energizing circuit 14 causes the latter to produce between its output terminals 35 and 36 a stylus energizing or marking voltage which consists of D.C. pulses occurring at a rate which is equal to the frequency of this applied input signal. In other words, a stylus energizing pulse is produced between the terminals 35 and 36 for each cycle of the input signal applied between the terminals 34. Suitable energizing voltages for this purpose are supplied to the circuit 14 from the power supply 15 by means of conductors 37. The details of typical arrangements for the circuit 14, which are capable of providing the foregoing operation, will be described hereinafter with reference to the forms of the circuit 14 illustrated in FIGS. 2 and 3.

The output terminal 35 is electrically connected to the stylus 21 by means of a conductor 38 and a brush type contact 39 which engages the stylus drive cable 22, to which the stylus 21 is electrically connected. Also, the output terminal 36 is electrically connected to the chart drive roll 18 by way of the common ground circuit of the recorder. Specifically, the terminal 36 is connected to the recorder ground as shown, while the roll 18 is grounded through its supporting bearings as diagrammatically shown at 40. Other means for connecting the stylus and chart roll to the circuit 14, differing from those shown in FIG. 1, may, of course, be employed where desired. For the purpose of completing the electrical marking circuit through the chart 19, the roll 18 must, of course, be formed of electrically conductive material.

As a result of the foregoing connections, the stylus energizing voltage pulses produced by the circuit 14 are applied between the stylus 21 and the roll 18. The occurrence of each of these pulses causes the stylus to make a mark on the chart 19 at the position thereon corresponding to the then-existing position of the stylus 21 along its path across the chart. Thus, as the stylus 21 is moved across the chart 19, from left to right in FIG. 1, and as the stylus is energized to mark the chart in response to the energizing pulses, the stylus produces along its path across the chart a trace composed of the foregoing marks. Since the stylus is moved across the chart in synchronism with the angular motion of the projector 2, and since the stylus is energized to mark the chart at a frequency which is a direct function of the intensity of the cloud-reflected light reaching the receiver 3, the trace thus produced has a variable density along its length which shows the relative values of the received light intensity for the corresponding values of projector angle, as is desired. Typical traces produced by the recorder are shown at 41 on the chart 19 in FIG. 1 by way of example.

Stated differently, the foregoing operation of the apparatus results in the production of a trace composed of marks, the spacing between any two adjacent marks being an inverse function of the specific value of received light intensity which exists when the value of the projector angle is that represented by the specific position along the trace at which this spacing occurs.

Since the closeness of the marks forming the trace, and hence the density of the latter, reach a maximum at at the position on the chart 19 representing the corresponding angular position of the projector 2 at which the received light is a maximum, and since the height of the corresponding cloud ceiling bears a fixed, known relationship to this particular value of angular projector position, the position of maximum trace density on the chart 19 will fall below the corresponding value of cloud height on the scale 28. Thus, the record on the chart 19 clearly exhibits the value of cloud height, as is desired. As shown in FIG. 1, successive traces on the chart 19, corresponding to successive scanning cycles of the projector 2, are spaced vertically on the chart by the chart advancing motion supplied by the motor 20.

As was noted hereinbefore, the circuit 17 controls the operation of the reversible stylus sweep or scanning motor 25 so that the stylus 21 is reciprocated across the chart 19 in synchronism with the cyclically repeated angular motion of the projector 2 as the latter performs its light beam sweeping cycles. To this end, the motor 25 is of the well known two-phase, capacitor type, and includes, in addition to the motor 26, a so-called up-scale drive winding 42 and a so-called down-scale drive winding 43. One end terminal of each of the windings 42 and 43 is connected to one conductor 44 of an A.C. supply which is in synchronism with, and preferably is the same as, the A.C. supply employed to energize the projector scanning drive motor 6.

The usual phase shifting condenser 45 is connected between the remaining end terminals 46 and 47 of the respective windings 42 and 43. Accordingly, when the terminal 46 is connected to the other conductor 48 of the A.C. supply, the motor 25 is energized to drive the stylus 21 in the up-scale direction, and when the terminal 47 is instead connected to the supply conductor 48, the motor 25 is energized to drive the stylus 21 in the down-scale direction.

The circuit 17 includes a synchronizing relay 49 and a motor reversing relay 50. The relay 49 includes an operating winding 51 and a pair of normally closed contacts 52 and 53, which are in engagement as long as the winding 51 is not operatively energized. The relay 50 includes an operating winding 54, a first pair of normally open contacts 55 and 56, a second pair of normally open contacts 57 and 58, and a movable contact member 59 which engages either a normally open contact 60 or a normally closed contact 61, depending upon whether or not the winding 54 is operatively energized.

The circuit 17 also includes a normally closed up-scale limit switch 62, a normally closed down-scale limit switch 63, a down-scale desensitizing resistor 64, an energizing voltage supply for the relay 49, shown as a battery 65, and an energizing voltage supply for the relay 50, shown as a battery 66. The up-scale limit switch 62 is arranged to open its normally closed contacts when the stylus 21 reaches the up-scale limit of its travel at the completion of each up-scale scanning sweep, and the down-scale limit switch 63 is arranged to open its normally closed contacts when the stylus 21 reaches the down-scale limit of its travel at the completion of each down-scale or return sweep. The respective one of the limit switches 62 and 63 is maintained open only as long as the stylus 21 occupies the corresponding limit position.

The several components of the circuit 17 as just described are connected in the following manner. The battery 65 is connected across the synchronizing relay winding 51 in series with a normally closed synchronizing switch 67 located at the projector 2. This switch is arranged to be opened for a brief period, such as approximately one-thirtieth of a second, each time the projector 2 starts one of its scanning cycles. Such operation of the switch 67 is conveniently obtained by the use of a cam 68 mounted for rotation with the projector 2 and arranged to open the switch 67 momentarily each time that one of the projector reflectors starts to move upward from its horizontal beam position. Therefore, at the start of each projector scanning cycle, the normally energized synchronizing relay 49 is momentarily deenergized.

The battery 66 is connected in series with the up-scale limit switch 62 and the synchronizing relay contacts 52 and 53 across the winding 54 of the reversing relay 50.

Also, the reversing relay contacts 55 and 56 are connected in parallel with the synchronizing relay contacts 52 and 53. Accordingly, when the limit switch 62 is closed, the momentary deenergization of the synchronizing relay 49 at the start of each projector scanning cycle causes the reversing relay 50 to be energized and to be sealed in this state, through its contacts 55 and 56, until the limit switch 62 is subsequently opened.

The movable contact 59 of the reversing relay 50 is connected to the supply conductor 48, while the cooperating normally open contact 60 is connected to the up-scale motor winding terminal 46. Also, the other cooperating, normally closed contact 61 is connected through the desensitizing resistor 64 to the down-scale motor winding terminal 47. Since the limit switch 63 is connected across the resistor 64, the latter is effective only when the stylus 21 occupies its down-scale limit position.

As a result of the foregoing connections, the motor 25 drives the stylus 21 up-scale as long as the reversing relay 50 is energized, and drives the stylus down-scale whenever the relay 50 is deenergized and the limit switch 63 is closed. With the relay 50 deenergized and the limit switch 63 open, the desensitizing resistor 64 causes the motor 25 to supply only the torque required to hold the stylus 21 at its down-scale limit of travel.

The manner in which the circuit 17 and the associated elements, as just described, cooperate to provide the desired synchronous reciprocating motion of the stylus 21 will now be described. Starting with the stylus 21 at its down-scale limit or zero altitude end of its transverse path, and with the synchronizing relay 49 energized and the reversing relay 50 deenergized, the stylus is maintained at its down-scale travel limit by the down-scale drive circuit completed through the relay contacts 59 and 61 and the desensitizing resistor 64.

Subsequently, the relay 50 becomes energized and sealed-in as the projector 2 starts a scanning cycle and causes the switch 67 to open momentarily and hence to momentarily deenergize the relay 49 and cause its contacts 52 and 53 to close for an instant. As soon as the relay 50 becomes energized, the resultant opening of the contacts 59 and 61 and closing of the contacts 59 and 60 respectively opens the down-scale holding circuit and causes the motor 25 to drive the stylus 21 in the up-scale direction. The resulting motion and position of the stylus 21 are synchronized with those of the projector 2 since the stylus is started on its travel at the instant that the projector starts its scanning cycle, and since both the projector and the stylus are driven by synchronous motors which are energized from the same A.C. source or, at least, from two synchronized A.C. sources.

The synchronized up-scale drive and motion of the stylus 21 is continued until the latter reaches its up-scale limit, at which time the limit switch 62 is opened. This action, which occurs as the projector 2 substantially reaches its vertical beam position, and hence the end of its current scanning cycle, opens the seal-in circuit for the reversing relay winding 54, thereby causing the relay 50 to become deenergized and to drop out. This terminates the up-scale drive of the stylus.

The deenergization of the relay 50 reverses the motor 25 and causes the latter to drive the stylus 21 in the down-scale direction. This action continues until the stylus reaches its down-scale travel limit, at which time the limit switch 63 opens and inserts the desensitizing resistor 64 into the down-scale motor circuit. This circuit is then energized at reduced power, so as to hold the stylus at the down-scale limit position until the projector signals, by the opening of the switch 67, the start of the next scanning cycle.

The down-scale motion of the stylus 21 obviously takes place while the projector 2 is rotating through an unused portion of its rotation toward the position in which it will be ready to start its next scanning cycle. In order to insure that the stylus 21 will have had sufficient time to return to its down-scale limit position and will be ready to start its up-scale scanning travel from this position at the instant that the projector starts its next scanning cycle, it may be desirable to so position the up-scale limit switch 62 that the motor 25 is reversed slightly in advance of the projector's reaching the exact end of its current scanning cycle. Such a procedure will allow for the acceleration and deceleration of the moving system and any other time lags, and will insure that the stylus will be able to start its up-scale travel from its down-scale limit at the instant that the projector starts its scanning cycle.

The relay contacts 57 and 58 of the reversing relay 50 are connected by conductors 69 to the stylus energizing circuit 14, and are arranged to prevent the stylus 21 from marking the chart 19 while the stylus is moving in the down-scale direction. Such return trace or retrace blanking is desirable, since the projector 2 is passing through an ineffectual portion of its rotation during the time in which the stylus is returning to its initial, down-scale limit position.

Specifically, the contacts 57 and 58 are arranged to prevent the stylus from marking the chart whenever these contacts are open, and to permit the stylus to mark the chart whenever they are closed. This results in the desired retrace blanking action, since the contacts 57 and 58 are closed only when the reversing relay 50 is energized, and hence only when the stylus is moving up-scale. Two specific ways in which the opening of the contacts 57 and 58 can be made to prevent the stylus from marking the chart will be shown in the following description of two forms of the stylus energizing circuit 14.

Figure 2:
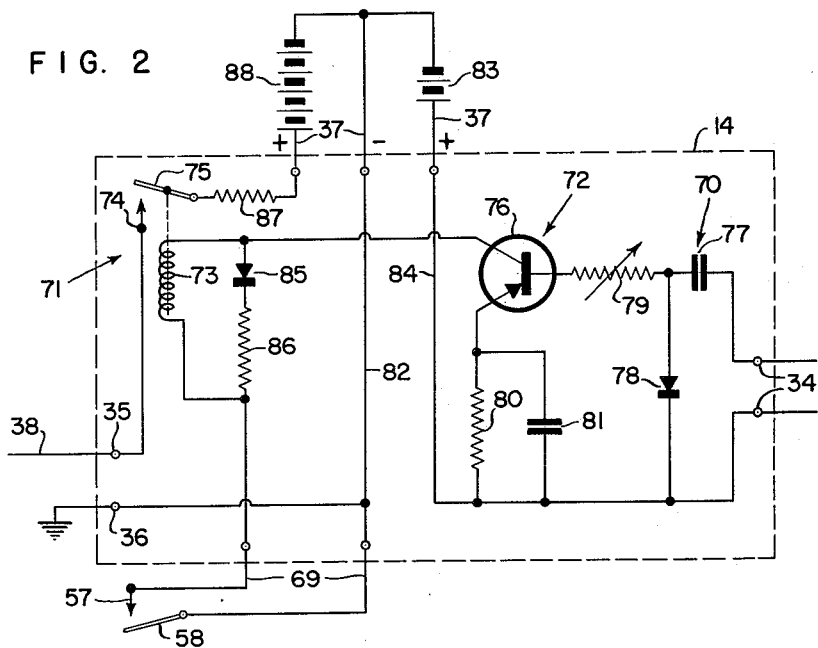
FIG. 2 is a schematic circuit diagram of the stylus energizing circuit portion of the FIG. 1 arrangement.
Figure 3:
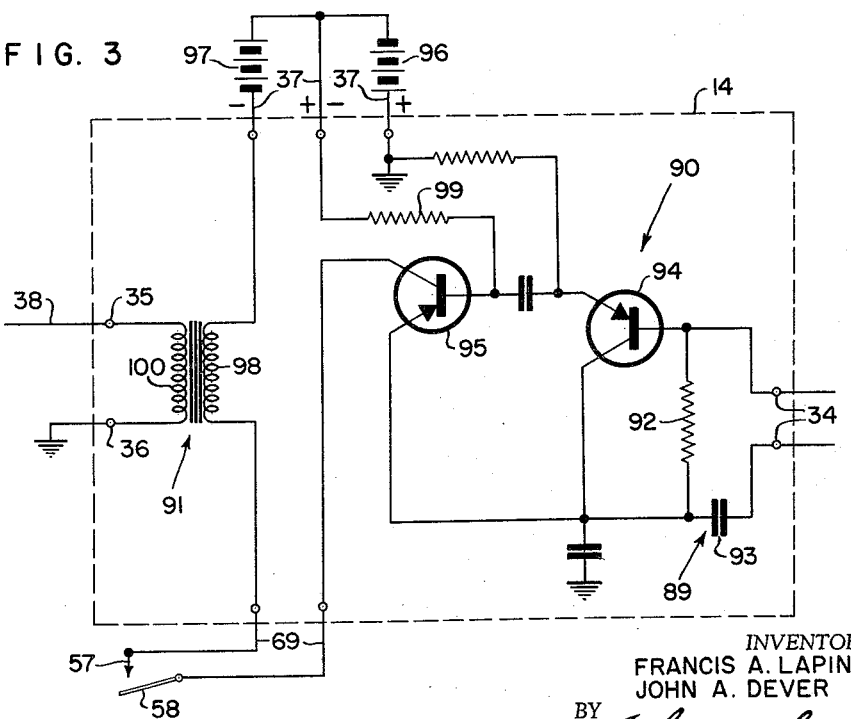
FIG. 3 is a schematic circuit diagram of a modification of the portion shown in FIG. 2.

One form which the stylus energizing circuit 14 may desirably take is shown in detail in FIG. 2. This circuit includes an input signal shaping or differentiating and rectifying network 70, a stylus energizing relay 71, and a transistorized relay amplifier stage 72. The relay 71 includes an operating winding 73 and a pair of normally open stylus marking controlling contacts 74 and 75, and is controlled by the amplifying stage 72. The latter includes a transistor 76 connected in a so-called class B grounded-emitter configuration and including the relay winding 73 in its load or collector-emitter circuit.

The network 70 includes a condenser 77 and a diode rectifier 78 which are connected in series in the order stated between the upper and lower ones of the input terminals 34. Thus, there appears across the rectifier 78 a differentiated and rectified version of the variable frequency input signal applied between the terminals 34 by the converter 13, the signal across the rectifier 78 consisting of a pulse for each cycle of said input signal.

The pulse signal produced across the rectifier 78 is applied to the input or base-emitter circuit of the transistor 76 so as to control the operation of the relay 71. To this end, the junction between the condenser 77 and the rectifier 78 is connected through an adjustable low signal blanking adjustment resistor 79 to the base of the transistor 76, while the lower terminal of the rectifier 78 is connected through a resistor 80 to the emitter of the transistor 76. A bypass condenser 81 is connected in parallel with the emitter resistor 80. By adjusting the value of the resistor 79, the stylus 21 can be prevented from marking for input signals below a desired minimum level.

The connection of the relay winding 73 in the transistor load circuit can be traced from the transistor collector to the upper end terminal of the winding 73, and from the lower end terminal thereof through one of the conductors 69 to the retrace blanking relay contact 57. The circuit continues from the cooperating contact 58 through the other of the conductors 69, a conductor 82, and one of the power supply conductors 37 to the negative terminal of a source of energizing voltage, shown as a battery 83. The positive terminal of this source or battery is connected through another of the conductors 37, a conductor 84, and the parallel-connected resistor 80 and condenser 81 to the emitter of the transistor 76, thus completing the transistor load or output circuit.

As a result of the foregoing connections, the relay 71 is operatively energized to close its contacts 74 and 75 once for each cycle of the variable frequency input signal applied between the terminals 34, providing that the retrace blanking contacts 57 and 58 are closed and that the input signal frequency is above the minimum value determined by the adjusted value of the resistor 79. The winding 73 is desirably shunted by a series network consisting of a diode rectifier 85 and a resistor 86 which serve to protect the transistor 76 during switching.

The stylus energizing circuit 14 applies energizing or marking voltage between the stylus conductor 38 and the grounded chart roll terminal 36 whenever the relay 71 is operatively energized. To this end, the conductor 38 is connected in series with the relay contacts 74 and 75, a current limiting resistor 87, and the remaining one of the conductors 37 to the positive terminal of a source of stylus energizing or marking voltage, shown as a battery 88. The negative terminal of the latter is connected through conductors 37 and 82 to the grounded terminal 36.

Accordingly, for each energization of the relay 71 and resulting closure of the contacts 74 and 75, and hence for each cycle of the input signal, a pulse of marking voltage from the battery 88 is applied between the terminals 35 and 36, and hence between the stylus 21 and the grounded chart roll 18, causing the stylus 21 to make a mark or dot on the chart 19. The resistor 87 limits the stylus current to a suitable value after the chart breaks down. The opening of the transistor collector circuit by the opening of the contacts 57 and 58 when the stylus is moving in the down-scale direction prevents the stylus from making marks on the chart during such motion.

The energizing means for the circuit 14 have been shown in FIG. 2 as the batteries 83 and 88 for purposes of description. In practice, however, such energizing means will usually be in the form of a conventional A.C. energized power supply, as shown in FIG. 1. The same applies for the relay operating batteries 65 and 66 of FIG. 1, as well as for the batteries shown in FIG. 3 and to be described hereinafter.

In a typical apparatus embodying the present invention which has been constructed in the foregoing manner, the projector rotated at 1 r.p.m., resulting in a sweep time of 15 seconds for the stylus. "Teledeltos" type L-48 chart paper, advanced at a rate of 2 to 4 inches per hour, was employed. The voltage to frequency converter was arranged to provide a square wave signal output or marking frequency of 2 to 40 c.p.s. for an input signal between the terminals 10 and 11 of 0 to 5 volts at 120 c.p.s. The stylus contact pressure was between 4 and 10 grams, and the marking current was limited to 35 ma. This required a stylus energizing voltage of approximately 200 volts. The recorder was set up to operate over an altitude range of 0 to 5000 feet.

As was mentioned hereinbefore, it may be desirable in some instances to make the intensity, as well as the frequency, of the recorded marks increase as the value of the received light increases. For this purpose, the circuit 14 may take the form illustrated in the modification of FIG. 3. This circuit is similar to that shown in FIG. 2 in that it includes a differentiating network 89 and a transistorized amplifier 90. In the FIG. 3 circuit, however, a transformer 91 replaces the relay 71 of FIG. 2.

The network 89 includes a resistor 92 and a condenser 93 which are connected in series in the order stated between the upper and lower ones of the terminals 34. Thus, there appears across the resistor 92 a differentiated pulse version of the input signal applied between the terminals 34.

The pulse signal produced across the resistor 92 is applied to the input of the amplifier 90, wherein it is amplified. As shown, the amplifier 90 is a transistorized degenerative tandem amplifier circuit of a known type, which is shown, for example, in FIG. 6.13 on page 122 of the book "Principles of Transistor Circuits," edited by Richard F. Shea. Since this circuit, and its operation as an amplifier, are fully described in the above noted book, it is sufficient to note herein that the amplifier 90 includes two transistors 94 and 95 which are energized by batteries 96 and 97. The resistor 92 is connected to the input of the amplifier 90 between the base and the collector of the transistor 94. The amplifier output appears across the primary winding 98 of the transformer 91, which winding is connected in series with the retrace blanking contacts 57 and 58, the battery 97, and a resistor 99 between the collector and the base of the transistor 95.

The transformer 91 also has a secondary winding 100, across which a pulse of stylus energizing or marking voltage is developed by the amplifier 90 for each cycle of the input signal applied between the terminals 34. Since the stylus 21 is connected by way of the conductor 38 and the terminal 35 to one end terminal of the winding 100, while the other end terminal of the latter is connected to the grounded chart roll 18 by way of the terminal 36, the FIG. 3 apparatus causes the stylus 21 to mark the chart 19 at a rate which is equal to the frequency of the input signal applied to the terminals 34. Also, the individual marks made by the stylus 21 will vary in intensity in accordance with this frequency, as is desired.

It should be readily apparent from the foregoing that there has been provided novel and relatively simple recording apparatus for producing a record of the simultaneous values of two variables, such as projector angle and reflected light intensity in a ceilometer arrangement, this record being formed by a single marking element and consisting of a series of marks in a trace, the frequency or the frequency and intensity of these marks at any given position along the trace being representative of the corresponding value of one of the variables, and this position along the trace being representative of the corresponding value of the other of the variables.

What is claimed is:

1. Recording apparatus for producing a record of the simultaneous values of two variables, comprising a stylus operative to mark a record medium solely when said stylus is actuated, first means responsive to the value of a first variable and arranged to provide relative motion between said stylus and the record medium along a path, and to cause the position of said stylus along said path to be representative of the value of the first variable, second means responsive to the value of a second variable to produce a variable frequency signal of a frequency which is varied so as to be representative of the value of the second variable, and third means constituting the sole means for effecting said actuation of said stylus, responsive to the variable frequency of said signal, and connected to said stylus to actuate the latter repeatedly and solely at said variable frequency to cause said stylus to mark the record medium repeatedly and solely at said variable frequency along said path to form a discontinuous trace on the record medium composed of marks spaced in correspondence with the value of the second variable.

2. Recording apparatus, comprising a recording stylus, first means for moving said stylus progressively along a path across a record medium in synchronism with the progressively changing value of a first variable, said stylus being prevented from marking the record medium except when said stylus is energized, converting means having an input adapted to receive an input signal of a magnitude which is representative of the value of a second variable, and having an output in which said converter produces a variable frequency signal of a frequency which is a predetermined function of the magnitude of said input signal, a stylus energizing means having an input to which said variable frequency signal is applied, and having an output in which said energizing means produces a stylus energizing signal consisting solely of energizing portions spaced according to said frequency, and means for causing solely said energizing signal to energize said stylus to mark the record medium repeatedly and solely at a rate which is equal to said frequency.

3. Apparatus as specified in claim 2, wherein the record medium is an electrosensitive recording chart, wherein said stylus is electrically conductive and is maintained in contact with said chart, wherein the latter is backed by an electrically conductive member on the side opposite to that contacted by said stylus, said member extending throughout the length of said path, and wherein the last mentioned means applies said energizing signal between said stylus and said member.

4. Apparatus as specified in claim 3, wherein said energizing means includes a differentiating network to cause said energizing signal to consist of a series of pulses occurring at said frequency, said stylus producing a mark on the record medium for each of said pulses.

5. Apparatus as specified in claim 3, wherein said energizing means includes electromagnetic means for applying pulses of stylus energizing voltage to the last mentioned output at said frequency to form said energizing signal, said stylus producing a mark on the record medium for each of said pulses.

6. Apparatus as specified in claim 5, wherein said electromagnetic means is a relay which is energized once for each cycle of said variable frequency signal.

7. Apparatus as specified in claim 5, wherein said electromagnetic means is a transformer.

8. Apparatus as specified in claim 2, wherein said first means moves said stylus along said path in a predetermined direction as the value of said first variable changes throughout a predetermined cycle, and moves said stylus along said path in the opposite direction at the completion of said cycle, and wherein said energizing signal is withheld from said stylus when the latter is moving in said opposite direction.

References Cited in the file of this patent

UNITED STATES PATENTS

| | | |
|---|---|---|
| 2,365,580 | Murcek | Dec. 19, 1944 |
| 2,447,018 | Keinath | Aug. 17, 1948 |
| 2,665,607 | Blakeslee et al. | Jan. 12, 1954 |
| 2,682,798 | Schock | July 6, 1954 |
| 2,768,050 | Alden | Oct. 23, 1956 |